United States Patent [19]
Oakberg

[11] Patent Number: 5,652,673
[45] Date of Patent: Jul. 29, 1997

[54] ELIMINATION OF MODULATED INTERFERENCE EFFECTS IN PHOTOELASTIC MODULATORS

[75] Inventor: Theodore C. Oakberg, Forest Grove, Oreg.

[73] Assignee: Hinds Instruments, Inc., Hillsboro, Oreg.

[21] Appl. No.: 266,722

[22] Filed: Jun. 24, 1994

[51] Int. Cl.$^6$ .................................................. G02F 1/33
[52] U.S. Cl. ........................... 359/308; 359/285; 359/313; 359/314
[58] Field of Search .................................. 359/308, 285, 359/312, 313, 314, 321, 322

[56] References Cited

U.S. PATENT DOCUMENTS

| | | | |
|---|---|---|---|
| 3,364,111 | 1/1968 | Kemp | 65/31 |
| 3,764,196 | 10/1973 | Dean et al. | 350/161 |
| 3,799,652 | 3/1974 | Torguet | 350/161 |
| 3,867,014 | 2/1975 | Kemp | 350/149 |
| 3,944,334 | 3/1976 | Yano et al. | 350/161 |
| 4,037,933 | 7/1977 | Yano et al. | 350/161 W |
| 4,639,092 | 1/1987 | Gottlieb et al. | 350/372 |
| 4,653,869 | 3/1987 | Gottlieb et al. | 350/372 |
| 4,845,719 | 7/1989 | Kitahara | 372/26 |
| 4,896,949 | 1/1990 | Melamed et al. | 350/358 |
| 5,264,957 | 11/1993 | Melamed et al. | 359/308 |
| 5,359,451 | 10/1994 | Gelbart et al. | 359/285 |

FOREIGN PATENT DOCUMENTS

| | | |
|---|---|---|
| 1149021 | 6/1989 | Japan. |
| 2-2509 | 1/1990 | Japan. |

OTHER PUBLICATIONS

"Polarization Photoelastic Radiation Modulator with Wavelength 10.6um", E.K. Galanov, et al. in Instruments and Experimental Techniques, vol. 23, No. 2, Mar. 1980; New York U.S. (pp. 470–473).

"Improvements of Phase–Modulated Ellipsometry", O. Archer, et al. in Review of Scientific Instruments, vol. 60, No. 1, Jan. 1989; New York, U.S. (pp. 65–77).

Hinds Instruments, *PEM–90 Photoelastic Modulators*, 10–page brochure, Dec. 1991.

Melles Griot Optics Guide, *Interference Filters*, Dec. 1990, pp. 11–25, 11–26 (2 pages), *Air–Spaced and Solid Etalons*, pp. 11–43 (1 page).

J.C. Canit and J. Badoz, *New Design for a Photoelastic Modulator*, Applied Optics, vol. 22, pp. 592–594, Feb. 15, 1983.

PEM–90 Application Note: *Modulated Interference Effects With Lasers*, T. Oakberg, circa, Jan. 1993.

Billardon et Badoz, *Modulator de Birefringence*, C.R. Acad. Sc. Paris, pp. 1672–1675, Jun. 27, 1966.

Kemp, *Peizo–Optical Birefringence Modulators : New Use for a Long–Known Effect*, Journal of Optical Society of America, pp. 950–954, Feb. 6, 1969.

Jasperson and Schnatterly, *An Improved Method for High Reflectivity Ellipsometry Based on a New Polarization Modulation Technique*, pp. 761–767, Jan. 23, 1969. (Best available copy).

One page specification sheet, Rocky Mountain Instrument Company, *Interferometer Flats*, circa, Jan. 1993.

*Primary Examiner*—Georgia Y. Epps
*Assistant Examiner*—Dawn-Marie Bey
*Attorney, Agent, or Firm*—Klarquist Sparkman Campbell Leigh & Whinston, LLP

[57] ABSTRACT

Modulated interference effects arising when laser beams are modulated by photoelastic modulators are substantially eliminated by methods and apparatus that extract from the detected beam the modulated, interfering light that emanates from the optical element of the modulator.

8 Claims, 3 Drawing Sheets

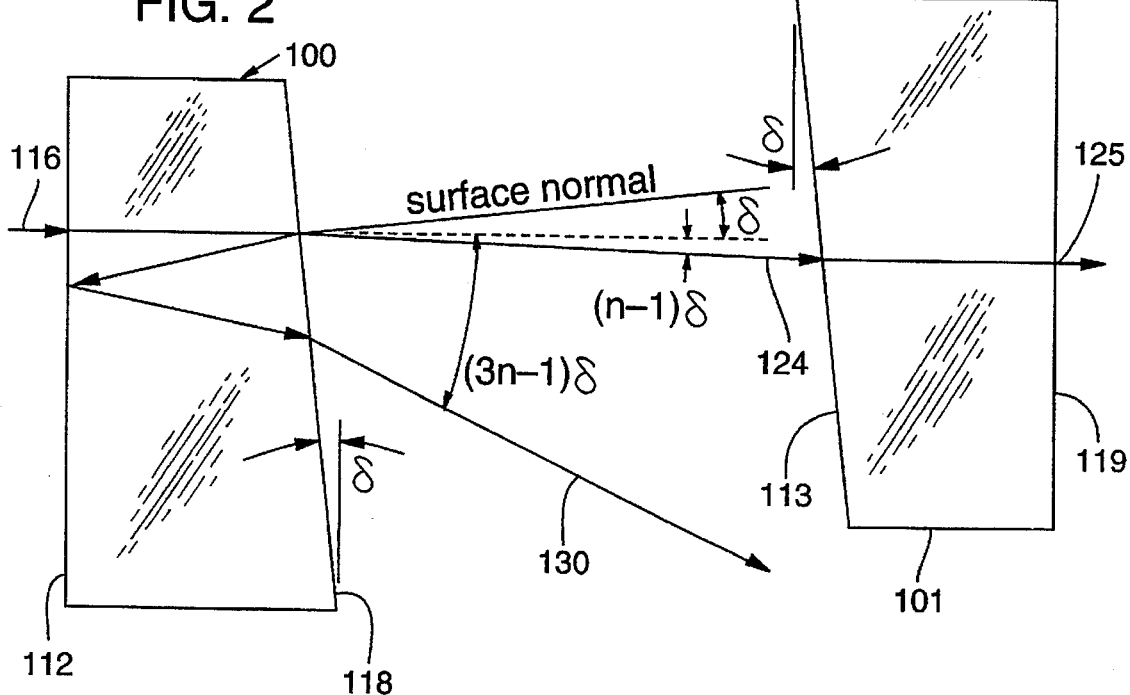
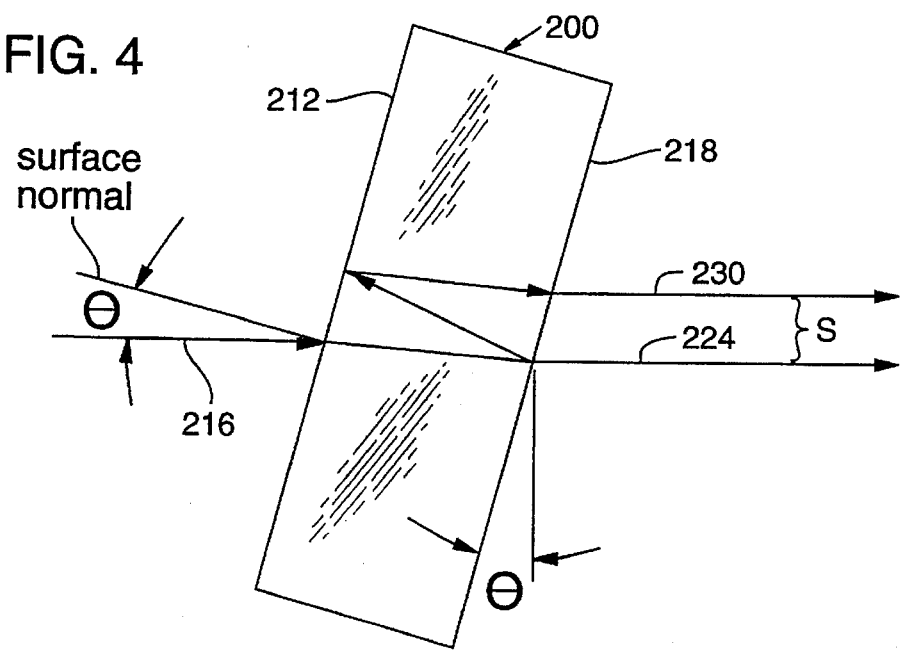

primary beam — secondary beam
Interference Present primary beam — secondary beam
Interference not Present $\frac{V_{AC}}{V_{DC}}$ vs $\Theta$ – DEGREES

ELIMINATION OF MODULATED INTERFERENCE EFFECTS IN PHOTOELASTIC MODULATORS

FIELD OF THE INVENTION

This invention pertains to suppression and elimination of modulated interference effects that are present in the output light signals of photoelastic modulators that modulate laser light.

BACKGROUND AND SUMMARY OF THE INVENTION

A photoelastic modulator (PEM) is an instrument that is used for modulating the polarization of a beam of light. A PEM employs the photoelastic effect as a principle of operation. The term "photoelastic effect" means that an optical element that is mechanically strained (deformed) exhibits birefringence that is proportional to the mount of strain induced into the element. Birefringence means that the refractive index of the element is different for different components of polarized light.

A PEM includes an optical element, such as fused silica, that has attached to it a transducer for vibrating the optical element at a fixed frequency, within, for example, the low-frequency, ultrasound range of about 20 kHz to 100 kHz. The mass of the element is compressed and extended as a result of the vibration.

The compression and extension of the optical element imparts oscillating birefringence characteristics into the optical element. The frequency of this oscillating birefringence is determined by the length of the optical element and the speed of the transducer-generated longitudinal vibration or sound wave through the material that comprises the optical element.

The effect of the oscillating birefringence of the PEM on a linear-polarized monochromatic light wave is to vary over time the phase difference between the orthogonal components of the light that propagates through the optical element. This phase difference is known as retardation or retardance and can be measured in terms of length, waves (for example, quarter-wave, half-wave), or phase angle.

The accurate measure and control of retardation (by precise detection of the polarization of the PEM output light) has numerous practical applications. Certain applications demand polarization measurement sensitivity levels on the order of $10^{-6}$.

The optical elements of some PEMs are shaped as rectangular bars. When laser light is directed via a surface-normal incidence angle through a rectangular optical element, most of that incident laser energy passes through the optical element. A small amount of the light, however, is internally reflected before exiting the element.

For instance, if one considers the beam that propagates directly through the element as the primary beam, a secondary beam that is twice internally reflected will also exit the optical element after traveling an optical path that is longer than that of the primary beam. That path (hence the path difference between the primary beam and the secondary beam) is a function of the thickness of the optical element. Since the thickness of the modulated optical element varies sinusoidally at the modulator reference frequency, an optical. element thickness change of the order of a wave length of the laser light will cause the path difference to amount to an interference condition that continuously varies from constructive interference to destructive interference. The interference can be observed by a detector as an intensity modulation occurring at the modulator frequency or one of its harmonics.

The interference attributable to the modulated secondary beam is referred to as modulated interference effects. The modulated interference effects may, in some applications, easily overpower the subtle polarization effects that are intended to be detected in a given application that uses a photoelastic modulator with laser light. That is, the interference occurs at precisely the frequency of the polarization signals sought to be detected and analyzed.

In the past, anti-reflective coatings have been used to reduce modulated interference effects. This solution is not completely satisfactory because, for example, since all of the internal reflection may not be eliminated by the coating, modulated interference effects for applications requiring highly sensitive measurements will still be detected.

This invention is directed to a photoelastic modulator system that substantially eliminates the modulated interference effects that occur when the photoelastic modulator is used for modulating laser light. Anti-reflective coatings are not applied.

BRIEF DESCRIPTION OF THE DRAWINGS

FIG. 2 is a diagram depicting one preferred embodiment of part of a photoelastic modulator system configured in accordance with the present invention for the purpose of eliminating modulated interference effects.

FIG. 4 is a diagram illustrating an alternative technique for eliminating modulated interference effects.

DETAILED DESCRIPTION OF PREFERRED EMBODIMENTS

Figure 1:
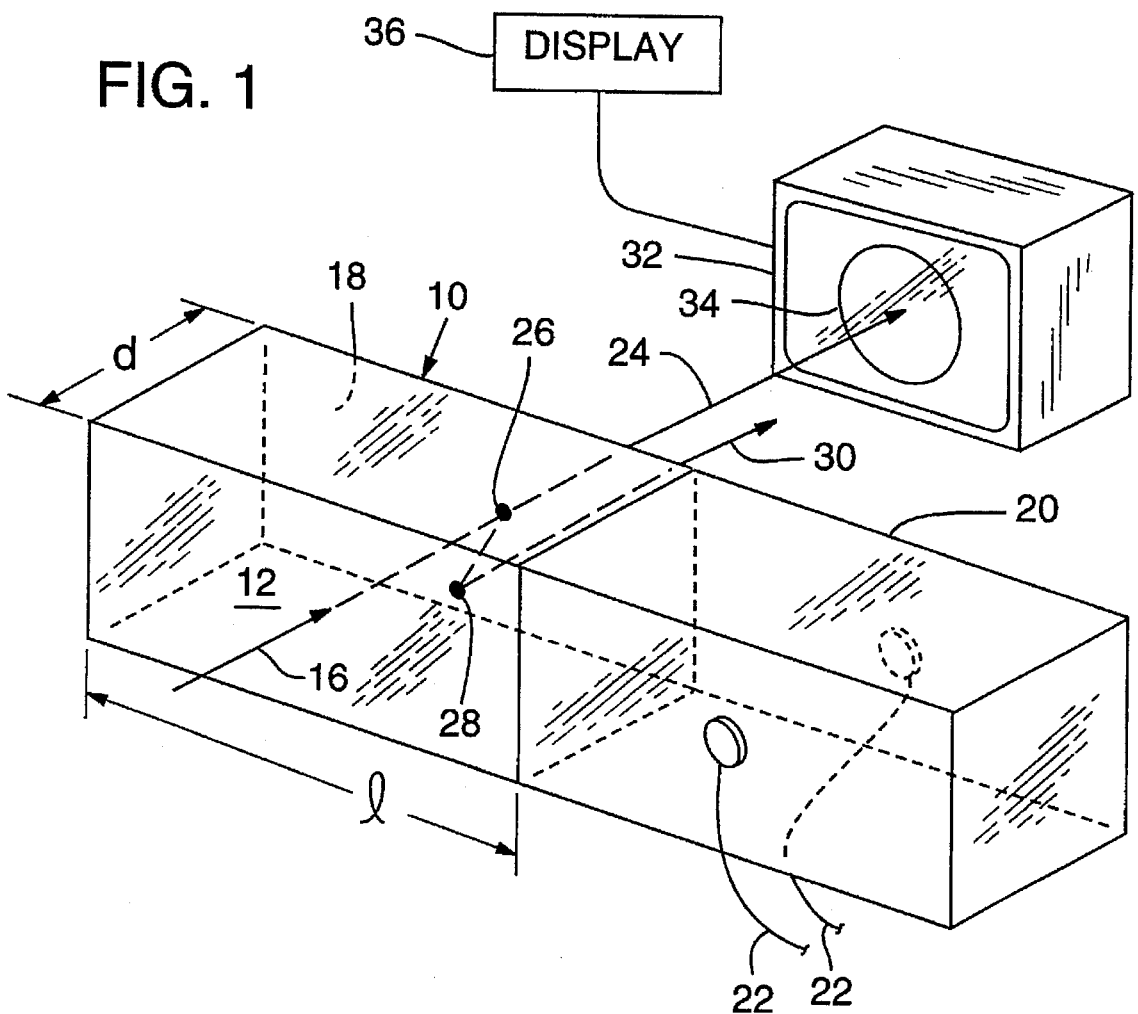
FIG. 1 is a diagram showing the primary components of a photoelastic modulator system.

FIG. 1 depicts the primary components of a photoelastic modulator, including an optical element 10 formed of fused silica. Other material, such as fused quartz, calcium fluoride, zinc selenide, silicon and others may be used to form the optical element. Preferably, the optical element is etched to reduce stress birefringence, in accordance with the teachings of U.S. Pat. No. 3,864,111, herein incorporated by reference.

The optical element 10 is an elongated bar having a length "l" and a depth or thickness "d". The optical element includes a planar "entry" surface 12 on one side thereof. This surface 12 is designated "entry" for the purpose of defining the surface against which an incident light wave traveling along an incident path 16 impinges as it enters the element. Light propagates through the element 10 and exits through an "exit" surface 18, which is the planar surface opposite the entry surface 12.

A quartz, piezoelectric transducer 20 is bonded to one short side of the element 10. Electrical leads 22 from the transducer are connected to a driver circuit for vibrating the optical element 10. The driver circuit may be tuned to drive the fused-silica element 10 to vibrate with a natural resonant frequency, typically about 50 kHz.

Typically, the optical element 10 is contained in a housing (not shown) that defines an aperture through which incident light will be directed through the portion of the element that most precisely exhibits the oscillating birefringence characteristics mentioned above.

An exemplary photoelastic modulator that incorporates the above-described components is available from Hinds Instruments, Inc., Hillsboro, Oreg. under the trademark PEM-90.

With continued reference to FIG. 1, in many applications the PEM system includes a conventional detector 32 that is located to receive on an active area, such as circular active area 34, the output light from the PEM element 10. The detector converts the light signals to electrical signals that are provided to an oscilloscope or similar display mechanism 36.

In instances where the incident light is laser (or other monochromatic, well-collimated, spectral light radiation), most of the energy associated with that beam will propagate through the optical element 10 along substantially the same incident path 16 and exit as a "primary" beam 24. A small percentage of the incident light (about 4% for fused silica), however, is reflected at the exit surface 18, such as illustrated at location 26 in FIG. 1. The same percentage of that internally reflected light is then reflected at the entry surface 12 as illustrated at location 28, from which reflection a "secondary" beam 30 emanates from the exit face 18.

It is noted that beams of light that are internally reflected four, six, etc. times in the element 10 will also emanate from exit surface 18. For the purposes of this description, however, only the mentioned secondary beam 30 will be considered.

As mentioned above, the path difference between the primary beam 24 and the secondary beam 30 in propagating through the element 10 establishes conditions whereby the modulated secondary beam interferes with the primary beam. The secondary, internally reflected beam becomes modulated because the two surfaces 12, 18 against which the secondary beam reflects are in relative motion. Specifically, the modulation of the optical element causes the thickness "d" of the bar (FIG. 1) to vary sinusoidally as:

$$d = d_0 + \Delta d \, \sin(2\pi f t)$$

where d is the width of the PEM optical element at time t; $d_0$ is the nominal (unstrained) thickness of the optical element; f is the frequency of vibration of the optical element; and $\Delta d$ is the amplitude of the sine function.

In instances where the magnitude of the overall variation in the thickness of the optical element (that is, $\Delta d$, the amplitude of the sine function) is of the order of magnitude, or greater than, the wave length of the laser light passing through the optical element, the modulated interference effects will occur.

For example, the modulated interference effects will occur in an optical element having a nominal thickness of about 6.35 mm, through which is directed laser light having a wave length of 632.8 nm. The interference may be observed by a detector, such as a photoconductive PIN-type, as an intensity modulation occurring at the modulator frequency, or twice the modulator frequency, etc.

The modulated interference effects may be quantified in terms of the detector output voltage as the ratio of the (intensity-modulated) AC component of the detector output, $V_{AC}$, to the DC component of the detector output, $V_{DC}$. The AC component is expressed as peak-to-peak voltage since this expression provides the envelope of any modulated interference, irrespective of whether it conforms to simple sine functions.

As noted above, the modulated interference effects occurring in the output of a photoelastic modulator using a laser light source is attributable to the presence of internally reflected secondary beam 30 (see FIG. 1). In accordance with one aspect of the present invention, the PEM system is configured and arranged so that the interfering, secondary beam is extracted from the output, thereby eliminating the modulated interference effects.

FIG. 2 depicts one preferred embodiment of the present invention. In this embodiment, the optical element 100 is formed of fused silica and is etched to reduce stress birefringence. The element is an elongated member, FIG. 2 being a side view of the free, short side of the element 100. To the opposing short side of the element 100 a quartz piezoelectric transducer is bonded (not shown). The element 100 is housed and modulated in the same manner as explained with respect to the embodiment depicted in FIG. 1.

The optical element 100 includes a planar entry surface 112 against which an incident beam of laser light traveling along an incident path 116 impinges as it enters the element 100. The exit surface 118 of the element 100 is in a plane that is angled by an amount $\delta$ from a plane that is parallel to the entry surface 112.

The relative orientation of the exit surface 118 to the incident path 116 of the laser light is such that the angle of intersection of that path with that surface is displaced from normal to the surface. As a result, the primary beam 124 emanating from the element 100 and the secondary beam 130 are deflected from the incident path 116. With reference to FIG. 2, the deflection of the primary beam 124 is shown as $(n-1)\delta$ where n is the refractive index of the optical element 100 and may be, for example, 1.457. For an optical element 100 having an average thickness of about 6.35 mm, and for the incident light beam conditions mentioned above, the angle $\delta$ may be, for example, about 1 degree (shown exaggerated for the purpose of illustration in FIG. 2). It is contemplated that acceptable results will occur with the angle $\delta$ greater than one degree.

The deflection of the secondary beam 130 from the incident path 116 is calculated as $(3n-1)\delta$. Consequently, the primary beam 124 and secondary beam 130 are deflected from the incident path 116 at different angles. The paths of those beams 124, 130 diverge.

Figure 3:
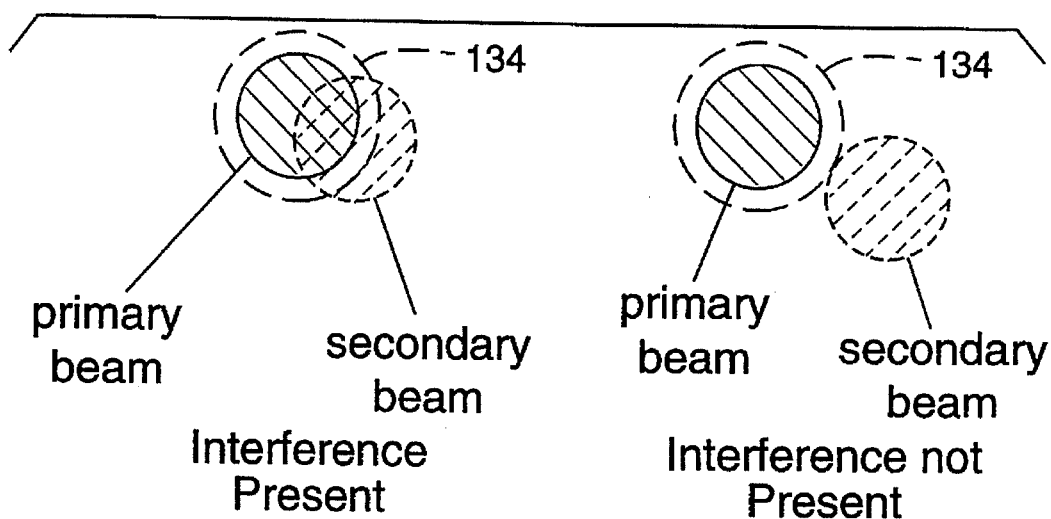
FIG. 3 is a diagram depicting the presence and elimination of modulated interference effects a detector.

As a result of the diverging paths of the primary beam 124 and secondary beam 130, a detector (or, any other analytical instrument for receiving the output of the PEM) may be located in the path of the primary beam 124 at a distance spaced from the optical element 100 by an amount sufficient to ensure that, at the detector, the primary beam and the secondary beam do not overlap, which overlap would introduce the modulated interference effects, as shown in the left side of FIG. 3. When the active area 134 of a detector is located where the primary beam and the secondary beam do not overlap, as shown in the right side of FIG. 3, interference is not present. Put another way, the arrangement shown in the right side of FIG. 3 illustrates a complete elimination of modulated interference effects.

In some instances, it may be desirable to redirect the primary beam 124 back to a path that is parallel to the incident path 116 to accommodate, for example, existing arrangements of laboratory equipment. To this end, a second optical element 101, which is not modulated, can be located in the path of the primary beam 124. The shape of this second optical element 101 complements the shape of the optical element 100 in that its planar entry surface 113 is angled from a plane parallel to its planar exit surface 119 by the above-described angle δ. As a result, the beam 125 emanating from that surface 119 is redirected to a path that is parallel to the incident path 116. Preferably, the second optical element 101 is located so that it is not intersected by the path of secondary beam 130.

The diagram of FIG. 4 depicts an alternative technique for reducing or eliminating modulated interference effects. In this embodiment, the optical element 200 is shown in side view depicting the short, free side of the optical element. The piezoelectric transducer is attached to the opposing short side of the optical element and is not shown. In this embodiment, a bar-shaped optical element is used. The planar entry surface 212 of the element is in a plane that is parallel to the planar exit surface 218 of the element. With respect to the incident path 216 of laser light, the optical element 200 is tilted by an angle θ. This tilting may be accomplished by permanently mounting the optical element 200 into the PEM housing at the angle θ, or by mounting the optical element and housing such that the element can be precisely rotated to vary the angle θ to that desired, as described more fully below.

As shown in FIG. 4, the effect of tilting by an angle θ the parallel-sided optical element 200 is to separate by a distance "s" the parallel paths of the primary beam 224 and the secondary beam 230 so that the overlap of those two beams can be reduced or eliminated, depending upon the selection of the angle θ and the properties of the incident light and optical element. In this regard, it is noteworthy that in many applications it may not be necessary to completely eliminate the overlap of the primary and secondary beams. It may be important to tilt the element 200 by the minimum angle θ that is sufficient to reduce the observed modulated interference effects (that is, reduce the amount of primary and secondary beam overlap) to acceptable levels. This tilt minimization may be desirable because the tilted orientation of the element 200 may induce some unwanted polarization effects in the primary beam 224.

Figure 5:
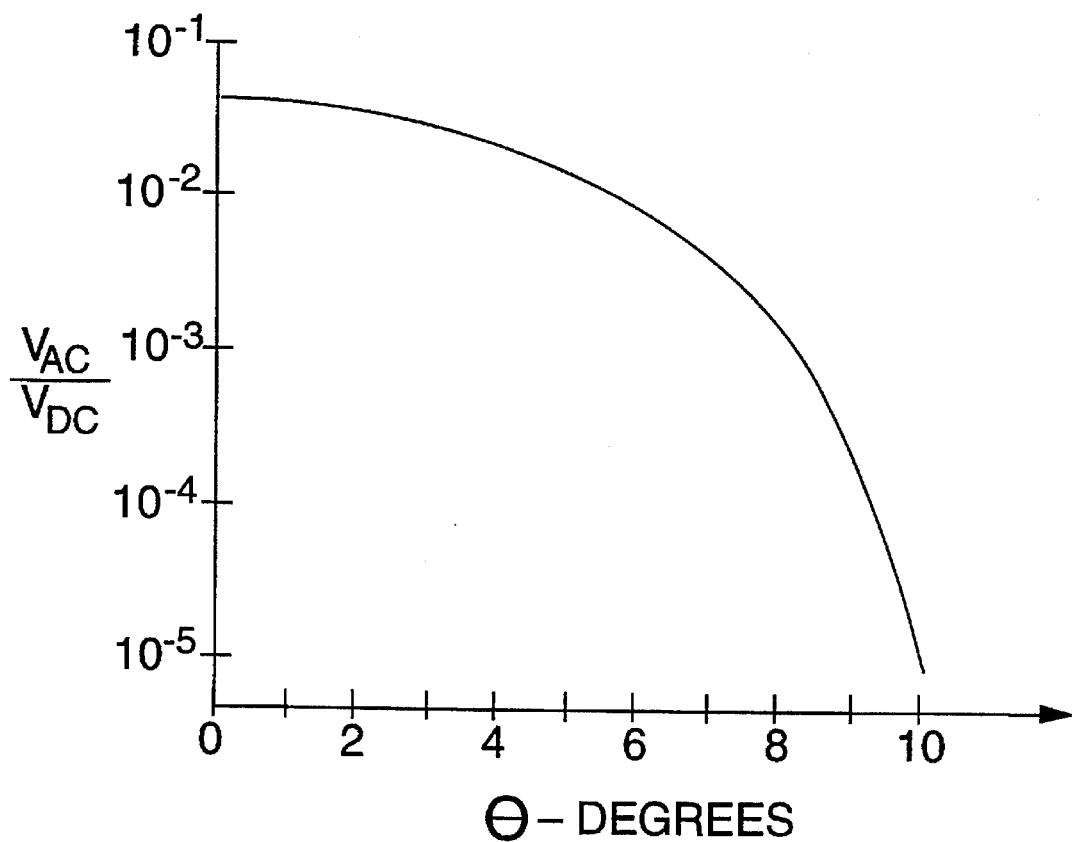
FIG. 5 depicts how modulated interference effects quantified on the ordinate of the graph vary in response to the changes in the angular orientation of a bar-type photoelastic modulator relative to an incident light beam.

FIG. 5 is a graph depicting on the ordinate the order of the modulated interference effects as quantified by the detector output as described above (that is, $V_{AC}/V_{DC}$). The abscissa represents the tilt angle θ. The curved line in FIG. 5 represents the reduction in the modulated interference effects one could expect by varying the angle θ in a system using laser light of a wavelength of 632.8 nanometers and having a nominal beam diameter of 0.87 nm, an optical element thickness of 6.35 mm and a refractive index of 1.457, and a photoconductive PIN-type detector having an active area diameter of 2.5 mm. Although FIG. 5 depicts the tilt angle θ in the range of 0°–15°, it is contemplated that an angle θ greater than 15° may be used with this embodiment.

Numerous PEM configurations, other than the bar-type mentioned above, may be used in carrying out the present invention. For example, an acceptable alternative would be a system that includes an optical element having a symmetrical shape and transducer arrangement as described in U.S. Pat. No. 3,867,014.

Moreover, the advantages of the present invention are available even when light other than laser light is used as a source. In this regard, it is noted that the secondary beam discussed above will pass through the optical element three times. The primary beam passes through the element once. Consequently, the secondary beam will acquire a phase retardation that is three times greater than that of the primary beam. This phase retardation difference can disrupt the polarization measurement of the primary beam, irrespective of whether the source light is laser or other light. The reduction or elimination of the secondary beam in accordance with the present invention can obviate this disruption in the polarization measurement of the primary beam.

In view of the many possible embodiments to which the principles of the invention may be put, it should be recognized that the foregoing description of preferred embodiments is illustrative only and should not be taken as limiting the scope of the invention. The invention includes all such embodiments which may come within the scope and spirit of the following claims and equivalents thereto.

I claim:

1. A photoelastic modulator system comprising:

a first optical element having a planar entry surface and a planar exit surface, and a resonant frequency;

a transducer attached to the first optical element and controlled for periodically varying the shape of the first optical element at a frequency substantially matching the resonant frequency of the first optical element and to induce oscillating birefringence in the first optical element;

a light source producing an incident beam of light directed along an incident path to propagate through the first optical element;

the first optical element exit surface being inclined relative to the incident path thereby to direct a path of a primary beam of light away from the path of a secondary beam of light, wherein the path of the secondary beam is a path of light that is internally reflected within the first optical element and propagates through the first optical element, and wherein the path of the primary beam is a path of light that is not internally reflected within the first optical element and propagates through the first optical element;

a second optical element having a first planar surface and a second planar surface that is in a plane that is angled relative to the plane of the first planar surface of the second optical element, and wherein the second optical element is located in the path of the primary beam of light; and a detecting instrument having a detecting part that is located in the path of the primary beam of light and away from the path of the secondary beam of light.

2. The system of claim 1 wherein the first optical element is configured so that the exit surface is in a plane that is parallel to the plane of the entry surface.

3. The system of claim 2 wherein the first optical element is mounted so that the angle by which the entry surface is inclined relative to the incident path is adjustable to provide control over the amount of overlap between the primary beam and the secondary beam.

4. The system of claim 1 wherein the light source produces laser light as the incident beam.

5. The system of claim 4 wherein the first optical element is configured so that the exit surface is in a plane that is angled relative to the plane of the entry surface.

6. A photoelastic modulator system comprising:

a first optical element having a planar entry surface and a planar exit surface, and a resonant frequency;

a transducer attached to the first optical element and controlled for periodically varying the shape of the first optical element at a frequency substantially matching the resonant frequency of the first optical element and to induce oscillating birefringence in the first optical element;

a light source producing an incident beam of light directed along an incident path to propagate through the first optical element;

the first optical element exit surface being inclined relative to the incident path thereby to direct a path of a primary beam of light away from the path of a secondary beam of light, wherein the path of the secondary beam is a path of light that is internally reflected within the first optical element and propagates through the first optical element, and wherein the path of the primary beam is a path of light that is not internally reflected within the first optical element and propagates through the first optical element; and a second optical element having a first planar surface and a second planar surface that is in a plane that is angled relative to the plane of the first planar surface of the second optical element; and wherein the second optical element is located in the path of the primary beam of light; and wherein the second element is not modulated.

7. A method of operating a photoelastic modulator system to substantially eliminate modulated interference effects, comprising the steps of:

providing an optical element having opposite ends and having a first planar surface and a second planar surface that is parallel to the first planar surface;

modulating the optical element by alternately compressing and extending the optical element between the ends at a frequency suitable to establish oscillating birefringence in the element;

directing a laser light beam along an incident path to intersect and pass through a portion of the element where the established oscillating birefringence introduces an oscillating retardance into the light beam, which retardance has a substantially uniform value throughout the element portion through which the beam is directed;

orienting the optical element so that the angle of intersection of the path with the first planar surface is displaced from normal to the surface;

determining the location of a primary path of light that passes though the optical element but is not internally reflected within the optical element;

determining the location of a secondary path of light that passes though the optical element after being internally reflected within the optical element;

locating a detector to detect the light travelling in the primary path and avoid detection of the light travelling in the secondary path; and adjusting the position of the optical element to change the distance between the primary path and the secondary path.

8. A method of operating a photoelastic modulator system to substantially eliminate modulated interference effects, comprising the steps of:

providing a first optical element having opposite ends and having a first planar surface and a second planar surface that is in a plane that is angled relative to the plane of the first planar surface;

modulating the first optical element by alternately compressing and extending the optical element between the ends at a frequency suitable to establish oscillating birefringence in the element;

directing a laser light beam along the incident path to intersect and pass through the first element;

orienting the first optical element so that the angle of intersection of the path with the first planar surface is displaced from normal to the surface;

providing a second optical element having a first planar surface and a second planar surface in the plane that is angled relative to the plane of the first planar surface of the second optical element;

wherein the directing step includes directing some of the light that passes through the first optical element through the second optical element;

determining the location of a primary path of light that passes through the first optical element without being internally reflected within the first optical element;

determining the location of a secondary path of light that passes through the first optical element after being internally reflected within the first optical element; and locating the second optical element to intersect the light traveling in the primary path.

* * * * *